(12) United States Patent
Liu et al.

(10) Patent No.: US 12,297,149 B2
(45) Date of Patent: May 13, 2025

(54) MULTIPHASE PARTICLE, MANUFACTURING PROCESS AND USE THEREOF

(71) Applicants: CHINA PETROLEUM AND CHEMICAL CORPORATION, Beijing (CN); PETROLEUM ENGINEERING RESEARCH INSTITUTE, SINOPEC, Beijing (CN)

(72) Inventors: Xuepeng Liu, Beijing (CN); Wei Liu, Beijing (CN); Shiming Zhou, Beijing (CN); Shidong Ding, Beijing (CN); Qian Tao, Beijing (CN); Qichun Wang, Beijing (CN)

(73) Assignees: CHINA PETROLEUM AND CHEMICAL CORPORATION, Beijing (CN); PETROLEUM ENGINEERING RESEARCH INSTITUTE, SINOPEC, Beijing (CN)

( * ) Notice: Subject to any disclaimer, the term of this patent is extended or adjusted under 35 U.S.C. 154(b) by 1150 days.

(21) Appl. No.: 17/257,789

(22) PCT Filed: Jun. 26, 2019

(86) PCT No.: PCT/CN2019/093089
§ 371 (c)(1),
(2) Date: Jan. 4, 2021

(87) PCT Pub. No.: WO2020/007220
PCT Pub. Date: Jan. 9, 2020

(65) Prior Publication Data
US 2021/0269360 A1    Sep. 2, 2021

(30) Foreign Application Priority Data
Jul. 4, 2018    (CN) .......................... 201810723706.9

(51) Int. Cl.
| | |
|---|---|
| *C04B 24/28* | (2006.01) |
| *C04B 28/02* | (2006.01) |
| *C04B 103/60* | (2006.01) |
| *C08G 18/10* | (2006.01) |
| *C08G 18/30* | (2006.01) |
| *C08G 18/48* | (2006.01) |
| *C08G 18/76* | (2006.01) |
| *C08J 9/00* | (2006.01) |
| *C08J 9/35* | (2006.01) |
| *C09K 8/467* | (2006.01) |

(52) U.S. Cl.
CPC ............ *C04B 24/282* (2013.01); *C04B 28/02* (2013.01); *C08G 18/10* (2013.01); *C08G 18/302* (2013.01); *C08G 18/4825* (2013.01); *C08G 18/7671* (2013.01); *C08J 9/0066* (2013.01); *C08J 9/35* (2013.01); *C09K 8/467* (2013.01); *C04B 2103/60* (2013.01); *C08J 2205/044* (2013.01); *C08J 2375/08* (2013.01)

(58) Field of Classification Search
None
See application file for complete search history.

(56) References Cited

U.S. PATENT DOCUMENTS

| | | | | |
|---|---|---|---|---|
| 2007/0072978 | A1* | 3/2007 | Zoromski | A61L 27/427 524/430 |
| 2007/0112082 | A1* | 5/2007 | Hahn | B29B 9/065 521/60 |
| 2011/0268972 | A1* | 11/2011 | Schips | C08J 9/22 428/407 |
| 2012/0305849 | A1* | 12/2012 | Lee | C09D 5/106 252/389.31 |
| 2013/0298991 | A1 | 11/2013 | Parker et al. | |
| 2017/0246765 | A1* | 8/2017 | Huang | C08K 3/26 |

FOREIGN PATENT DOCUMENTS

| | | |
|---|---|---|
| CN | 1890309 A | 1/2007 |
| CN | 1948384 A | 4/2007 |
| CN | 102272222 A | 12/2011 |
| CN | 103146368 A | 6/2013 |
| CN | 102604610 A | 3/2014 |
| CN | 103804890 A | 5/2014 |
| CN | 103906781 A | 7/2014 |
| CN | 104804172 A | 7/2015 |
| CN | 107973538 A | 5/2018 |
| CN | 108164244 A | 6/2018 |
| JP | 2002012645 A | 1/2002 |
| WO | 2013030173 A1 | 3/2013 |

* cited by examiner

*Primary Examiner* — Christopher M Rodd
(74) *Attorney, Agent, or Firm* — NKL Law; Allen Xue (57) ABSTRACT

A multiphase particle has a multiphase structure comprising a first phase and a second phase and has an average particle size of 0.1-100 mm. The multiphase particle has a high bulk strength and a good interface binding power with the hardened cement and is particularly suitable for the toughening application of the hardened cement.

8 Claims, 5 Drawing Sheets

MULTIPHASE PARTICLE, MANUFACTURING PROCESS AND USE THEREOF

TECHNICAL FIELD

The present invention relates to a multiphase particle, in particular to a multiphase particle for toughening the hardened cement. The present invention also relates to a manufacturing process for the multiphase particle and use thereof.

BACKGROUND TECHNOLOGY

Well cementation is a very important link in the well drilling operation. During the drilling cycle of an oil well, several well cementations are typically required. The well cementation is primarily performed by injecting a cement slurry down to the well and curing to form a "cement sheath" between the well cementation sleeve and the oil well rock wall. Typically, the "cement sheath" of the oil well formed with the cement slurry for the well cementation requires in the down-well to withstand the perforation impact of high-energy jet, the impact of large-scale fracturing and staged fracturing, and the collision impact of the sleeve and drill on the "cement sheath" upon continuing the drilling. In addition, due to the existence of the earth crust effect, the "cement sheath" for the well cementation is still subjected to the huge internal stress generated by the change of the earth crust structure, if the strength and the toughness of the hardened cement for the well cementation are not enough, deformation and cracks are generated, the integral integrity of the hardened cement for the well cementation is damaged, resulting in that the later-stage interlayer sealing performance fails, there are potential safety hazards for the later-stage production-increasing measures and the development and production of the oil and gas well, especially the high-acid-content gas well, the normal operation of the well can be seriously influenced, even the permanent damage of the well is caused, and huge economic loss is caused. Therefore, the "cement sheath" for the well cementation typically requires the addition of components that increase its toughness and strength to lessen the likelihood of damage due to its brittleness.

In order to improve the toughness of the hardened cement, the prior art mainly adopts a method of adding elastic particles such as rubber elastomer for modification. The elastic particles are an elastic material. The cement formed with the elastic particles has a lower Young modulus and a higher Poisson ratio compared with an ordinary cement, can better absorb the cement deformation energy caused by expansion of the sleeve during fracturing, and reduces the risk of sealing failure of the "cement sheath".

Chinese patent CN201310066429 (an elastic cement slurry for well cementation and a manufacturing process thereof) discloses a cement slurry for well cementation, wherein a material named as WF-1 is used as the elastic material. Chinese patent 201210029069 (an elastic cement slurry for well cementation and a manufacturing process thereof) also discloses a cement slurry for well cementation, wherein a natural rubber powder/an industrial synthetic rubber powder is used as the elastic material.

SUMMARY OF THE INVENTION

The inventors of the present invention have found that the conventional elastic particles for the well cementation are generally elastic rubber powder, and the surface of the rubber powder is hydrophobic or has poor hydrophilicity, so that the cementing power with cement is poor. The term "cementing power" refers to the bonding force between molecules on the interface of the objects to be bonded. The influence of the oil well cement on the interface cementing power of the bonded objects has been taken into account by the engineering community in a long time, and the influence is mainly focused on the changes of the cementing power and the bearing capacity. At present, because the interface cementing power of the elastic particles for the well cementation with the hardened cement is not enough, the elastic particles are easy to delaminate from the hardened cement under the action of the internal stress of the fracturing or the crustal movement, so that the pores in the hardened cement are formed to become serious defects. Therefore, in this case, the elastic particles do not play a role of toughening but become a negative factor for breaking the hardened cement.

The inventors of the present invention have found a multiphase particle through an assiduous investigation. The multiphase particle can remedy the defect of insufficient interface cementing power between the elastic particles and the hardened cement in the prior art, and based on that, the present invention is completed.

Specifically, the present invention relates to the following aspects.

1. A multiphase particle, having a multiphase structure comprising (preferably consisting of) a first phase and a second phase, wherein the multiphase structure has, at least in part, a morphology (1): the first phase is a continuous phase having, at least in part, a porous structure, the second phase is a dispersed phase, wherein at least one (preferably 50% or more, 60% or more, 80% or more, 90% or more of the total or substantially all) of the second phases has a substantially spherical shape (referred to as a spherical second phase) and at least one (preferably 50% or more, 60% or more, 80% or more, 90% or more of the total or substantially all) of the spherical second phases is located within pores (in particular substantially circular pores) of the porous structure of the first phase, or the multiphase structure has, at least in part, a morphology (2): the second phase is a continuous phase (e.g. having a loose structure or an amorphous structure), the first phase is a dispersed phase, wherein at least one (preferably 50% or more, 60% or more, 80% or more, 90% or more of the total or substantially all) of the first phase has a substantially columnar shape (e.g. at least one columnar shape selected from a cylinder shape and a prism shape) (referred to as a columnar first phase), or the multiphase structure has, at least in part, a morphology (3): a combined morphology of the morphology (1) and the morphology (2), and the average particle size of the multiphase particle is at least 0.1 mm (preferably at least 0.2 mm, at least 0.35 mm, at least 0.5 mm, at least 0.75 mm, or at least 0.8 mm), and at most 100 mm (preferably at most 50 mm, at most 20 mm, at most 10 mm, at most 5 mm, at most 2 mm, at most 1.2 mm, or at most 1.0 mm).

2. The multiphase particle according to any of aforementioned and aftermentioned aspects, wherein the ratio of the content (in wt %) of the Si element in the second phase to the content (in wt %) of the Si element in the first phase is 5-20, 8-12, or 9-11.

3. The multiphase particle according to any of aforementioned and aftermentioned aspects, having surface Si—OH groups and/or surface —NCO groups.

4. The multiphase particle according to any of aforementioned and aftermentioned aspects, having a BET specific surface area of 1-200 $m^2/g$, 5-50 $m^2/g$ or 10-30 $m^2/g$, and/or a water contact angle of 20-60°, 25-50°, 30-45° or 35-40° and/or a pH value of 7-10, 7.5-9 or 8-9 and/or an apparent density of 1.1-1.6 g/cm$^3$ or 1.2-1.3 g/cm$^3$.

5. The multiphase particle according to any of aforementioned and aftermentioned aspects, wherein the spherical second phase has a diameter of 0.1-50 microns (preferably 0.2-25 microns, 0.5-20 microns, 1-10 microns or 2-8 microns), and/or the pore has an orifice size of 0.05-100 microns (preferably 0.2-50 microns, 0.5-25 microns or 1-15 microns), and/or the first phase in the columnar shape has a length of 0.1-50 microns (preferably 0.2-20 microns, 0.5-10 microns or 1-5 microns) and a diameter of 0.1-10 microns (preferably 2-5 microns), and/or the multiphase particle has a Si element (as Si) content of 0.5-5 wt % (preferably 1-3.5 wt %), based on the total mass of the multiphase particle being 100 wt %.

6. The multiphase particle according to any of aforementioned and aftermentioned aspects, wherein the spherical second phase is located within the pores, and the ratio of the orifice size of the pore to the diameter of the spherical second phase is at least 1, greater than 1, 1.05, 1.1, 1.15 or 1.2, and at most 10, 5, 2, or 1.5.

7. The multiphase particle according to any of aforementioned and aftermentioned aspects, which at least contains in its composition an organic substance (especially an organic polymer, preferably a polyurethane, especially an aromatic polyurethane) and a silicon element (especially a silicon element present in an oxide form, especially at least one silicon-containing substance selected from silicate and silicon dioxide), and optionally an inorganic substance except for the silicon element (for example at least one inorganic substance selected from a carbonate, a phosphate, a sulfate, an aluminate, a refractory oxide (except for silicon dioxide) and a hydroxide, especially at least one inorganic substance selected from a carbonate and a hydroxide).

8. The multiphase particle according to any of aforementioned and aftermentioned aspects, wherein the Si element (as Si) content of the second phase is 15-25 wt % (preferably 18-21 wt %), the Si element (as Si) content of the first phase is 1-8 wt % (preferably 1.5-5 wt %).

9. A manufacturing process for a multiphase particle, comprising at least the following steps:

A reaction step: reacting at least one polyfunctional organic monomer (for example an organic compound having two or more isocyanate (—NCO) groups per molecule, especially for example at least one selected from a polyisocyanate, a polyurethane prepolymer and a polyurea prepolymer, especially at least one selected from a $C_4^+$ aliphatic polyisocyanate, a $C_4^+$ cycloaliphatic polyisocyanate, an aromatic polyisocyanate, a polyurethane prepolymer derived from at least one of these polyisocyanates, and a polyurea prepolymer derived from at least one of these polyisocyanates, especially at least one selected from an $C_4^+$ aliphatic diisocyanate, a $C_4^+$ cycloaliphatic diisocyanate, an aromatic diisocyanate, a polyurethane prepolymer derived from at least one of these diisocyanates, and a polyurea prepolymer derived from at least one of these diisocyanates, especially at least one selected from toluene diisocyanate, 4,4'-diphenylmethane diisocyanate, 4,4'-dicyclohexylmethane diisocyanate, isophorone diisocyanate, hexamethylene diisocyanate, 1,4-cyclohexane diisocyanate, naphthalene diisocyanate, a polyurethane prepolymer derived from at least one of these diisocyanates, and a polyurea prepolymer derived from at least one of these diisocyanates, especially at least one selected from 4,4'-diphenylmethane diisocyanate, a polyurethane prepolymer derived from the diisocyanate, and a polyurea prepolymer derived from the diisocyanate, especially a polyurethane prepolymer derived from 4,4'-diphenylmethane diisocyanate) and at least one polyfunctional inorganic monomer exhibiting a chemical reaction activity to the polyfunctional organic monomer (for example an inorganic compound having 2 or more —OH groups per molecule and/or a precursor thereof, especially for example at least one selected from a silica sol, an alumina sol, a zirconium sol, a titanium sol, a silicate ester, an aqueous silicate ester solution, a silicate salt, an aqueous silicate salt solution, an aluminate salt, an aqueous aluminate salt solution, a titanate ester, an aqueous titanate ester solution, a zirconate ester, an aqueous zirconate ester solution and water, especially at least one selected from silica sol and an aqueous silicate salt solution, especially an aqueous silicate salt solution, for example water glass) in presence of optionally at least one inorganic nanoparticle (for example a nanoparticle consisting essentially of an inorganic substance, for example at least one selected from calcium carbonate nanoparticle, silica nanoparticle and hydrotalcite nanoparticle, especially calcium carbonate nanoparticle, more especially heavy calcium carbonate nanoparticle) and optionally at least one polyfunctional reactive hydrogen organic compound (for example an organic compound containing two or more reactive hydrogen atoms per molecule, especially for example at least one selected from a polyamine, a polycarboxylic acid, a polyphenol, a polythiol and a polyol, especially at least one selected from a polyether polyol and a polyester polyol, especially a polyether polyol, preferably the polyether polyol has a number-average molecular weight of 500-8000, preferably 1000-6000 and a hydroxy functionality of 2-3, in particular preferably the polyether polyol is at least one selected from a polytetrahydrofuran diol and a polypropylene oxide polyol, in particular preferably a polypropylene oxide polyol or a polypropylene oxide glycol, especially at least one selected from polypropylene oxide glycol 1000, polypropylene oxide glycol 2000, polypropylene oxide glycol 3000, polypropylene oxide glycol 5000 and polypropylene oxide glycol 6000), in presence of a catalyst (for example at least one selected from a carboxylate salt, a metal alkyl compound, a quaternary ammonium salt and a tertiary amine, especially at least one selected from stannous octoate, potassium carboxylate and dibutyl tin dilaurate) or in absence of a catalyst to obtain an organic-inorganic composite material in a solid form, and A comminution step: comminuting the organic-inorganic composite material to obtain the multiphase particle, wherein the average particle size of the multiphase particle is at least 0.1 mm (preferably at least 0.2 mm, at least 0.35 mm, at least 0.5 mm, at least 0.75 mm or at least 0.8 mm), at most 100 mm (preferably at most 50 mm, at most 20 mm, at most 10 mm, at most 5 mm, at most 2 mm, at most 1.2 mm or at most 1.0 mm).

10. The manufacturing process for the multiphase particle according to any of aforementioned and aftermentioned aspects, wherein the ratio of the total weight of said at least one polyfunctional organic monomer and said optionally at least one polyfunctional reactive hydrogen organic compound to the total weight of said at least one polyfunctional inorganic monomer and said optionally at least one inorganic nanoparticle is 1:1-5:1, preferably 1.5:1-3.5:1, and/or, the weight ratio of said at least one polyfunctional inorganic monomer (especially said aqueous solution or said sol, especially aqueous silicate salt solution or silica sol, more especially water glass) to said at least one inorganic nanoparticle is 100:90-100:30, 100:80-100:40, 100:75-100:45 or 100:65-100:55, and/or, the ratio of the mole number of said at least one polyfunctional organic monomer (in terms of the functional group, particularly the isocyanate group) to the mole number of said at least one polyfunctional reactive hydrogen organic compound (in terms of the reactive hydrogen, especially in terms of the hydroxy) is 1.1:1-2:1, 1.1:1-1.5:1 or 1.1:1-1.2:1.

11. The manufacturing process for the multiphase particle according to any of aforementioned and aftermentioned aspects, wherein the solid content of said aqueous solution or said sol (especially aqueous silicate salt solution or silica sol, more especially water glass) is 20-70 wt %, 35-55 wt % or 40-50 wt %, and/or, the average particle size of said at least one inorganic nanoparticle is 150-500 nm, 200-350 nm or 270-300 nm.

12. The manufacturing process for the multiphase particle according to any of aforementioned and aftermentioned aspects, wherein said polyurethane prepolymer is formed by the polyreaction of said polyisocyanate (especially at least one selected from toluene diisocyanate, 4,4'-diphenylmethane diisocyanate, 4,4'-dicyclohexylmethane diisocyanate, isophorone diisocyanate, hexamethylene diisocyanate, 1,4-cyclohexane diisocyanate and naphthalene diisocyanate, especially 4,4'-diphenylmethane diisocyanate) and a polyol (especially at least one selected from a polyether polyol and a polyester polyol, especially a polyether polyol, preferably the polyether polyol has a number-average molecular weight of 500-8000, preferably 1000-6000 and a hydroxy functionality of 2-3, in particular preferably the polyether polyol is at least one selected from a polytetrahydrofuran diol and a polypropylene oxide polyol, in particular preferably a polypropylene oxide polyol or a polypropylene oxide glycol, especially at least one selected from polypropylene oxide glycol 1000, polypropylene oxide glycol 2000, polypropylene oxide glycol 3000, polypropylene oxide glycol 5000 and polypropylene oxide glycol 6000) in presence of a catalyst (for example at least one selected from a carboxylate salt, a metal alkyl compound, a quaternary ammonium salt and a tertiary amine, especially at least one selected from stannous octoate, potassium carboxylate and dibutyl tin dilaurate) or in absence of a catalyst, and its NCO content is 1-7 wt %, 2-5 wt % or 3-4 wt %.

13. The manufacturing process for the multiphase particle according to any of aforementioned and aftermentioned aspects, comprising the steps of:
  (1) reacting said at least one polyfunctional organic monomer and said at least one polyfunctional reactive hydrogen organic compound in a predetermined ratio in presence of said catalyst or in absence of said catalyst to obtain an A-component (especially a polyurethane prepolymer, its NCO content is 1-7 wt %, 2-5 wt % or 3-4 wt %);
  (2) mixing said at least one polyfunctional inorganic monomer and said at least one inorganic nanoparticle in a predetermined ratio to obtain a B-component;
  (3) mixing and curing the B-component and the A-component; and
  (4) comminuting and optionally sieving the solid obtained in step (3) to obtain the multiphase particle.

14. The manufacturing process for the multiphase particle according to any of aforementioned and aftermentioned aspects, wherein in the step (1), the ratio of the mole number of said at least one polyfunctional organic monomer (in terms of the functional group, particularly the isocyanate group) to the mole number of said at least one polyfunctional reactive hydrogen organic compound (in terms of the reactive hydrogen, especially in terms of the hydroxy) is 1.1:1-2:1, 1.1:1-1.5:1 or 1.1:1-1.2:1, and/or, in the step (2), the weight ratio of said at least one polyfunctional inorganic monomer to said at least one inorganic nanoparticle is 100:90-100:30, 100:80-100:40, 100:75-100:45 or 100:65-100:55, and/or, in the step (3), the condition for mixing the component A and the component B is: the weight ratio of the component A to the component B is 1:1-5:1 (preferably 1.5:1-3.5:1), the stirring speed: 1500-2000 rpm (preferably 1600-1800 rpm), mixing time: 15-90 s (preferably 20-40 s), mixing temperature: 30-90° C. (preferably 50-70° C.).

15. Use of the multiphase particle according to any of aforementioned and aftermentioned aspects or the multiphase particle produced by the manufacturing process according to any of aforementioned and aftermentioned aspects as a toughening agent.

16. An inorganic cementitious composition, which at least contains an inorganic cementitious material (for example a hydraulic inorganic cementitious material, especially a cement), and the multiphase particle according to any of aforementioned and aftermentioned aspects or the multiphase particle produced by the manufacturing process according to any of aforementioned and aftermentioned aspects, wherein relative to 100 parts by weight of the inorganic cementitious material, the multiphase particle comprises 0.5-50 parts by weight (preferably 5-30 parts by weight, especially 10-20 parts by weight).

17. A manufacturing process for an inorganic cementitious composition, which at least comprises a step of mixing an inorganic cementitious material (for example a hydraulic inorganic cementitious material, especially a cement) and the multiphase particle according to any of aforementioned and aftermentioned aspects or the multiphase particle produced by the manufacturing process according to any of aforementioned and aftermentioned aspects, wherein relative to 100 parts by weight of the inorganic cementitious material, the multiphase particle comprises 0.5-50 parts by weight (preferably 5-30 parts by weight, especially 10-20 parts by weight).

18. A process for toughening an inorganic cementitious material, which at least comprises a step of introducing the multiphase particle according to any of aforementioned and aftermentioned aspects or the multiphase particle produced by the manufacturing process according to any of aforementioned and aftermentioned aspects into the inorganic cementitious material (for example a hydraulic inorganic cementitious material, especially a cement), wherein relative to 100 parts by weight of the inorganic cementitious material, the multiphase particle comprises 0.5-50 parts by weight (preferably 5-30 parts by weight, especially 10-20 parts by weight).

Alternatively, the present invention relates to the following aspects.

1. A multiphase particle characterized in that the multiphase particle comprises an organic component and an inorganic component in a mass ratio of 1:1-5:1, the particle size of the multiphase particle is 0.5-1.2 mm;
  Wherein the organic component is polyurethane prepolymer, the inorganic component comprises an aqueous silicate salt solution and a nano filler, the mass ratio of the aqueous silicate salt solution to the nano filler is 100:90-100:30, and the concentration of the aqueous silicate salt solution is 20-70 wt %.

2. The multiphase particle according to any of aforementioned and aftermentioned aspects, wherein: The nano filler is at least one selected from nano calcium carbonate, nano silica or nano hydrotalcite, and the particle size of the nano filler is 150-500 nm.

3. The multiphase particle according to any of aforementioned and aftermentioned aspects, wherein: The particle size of the nano filler is 200-350 nm, preferably 270-300 nm.

4. The multiphase particle according to any of aforementioned and aftermentioned aspects, wherein:

The particle size of the multiphase particle is 0.75-1.0 mm, the mass ratio of the organic component to the inorganic component is 1.5:1-3.5:1, the mass ratio of the aqueous silicate salt solution to the nano filler is 100:80-100:40, and the concentration of the aqueous silicate salt solution is 35-55 wt %.

5. The multiphase particle according to any of aforementioned and aftermentioned aspects, wherein: the mass ratio of the aqueous silicate salt solution to the nano filler is 100:75-100:45, the concentration of the aqueous silicate salt solution is 40%-50%.

6. The multiphase particle according to any of aforementioned and aftermentioned aspects, wherein: The polyurethane prepolymer is formed by reacting a polyisocyanate with a polyether polyol.

7. The multiphase particle according to any of aforementioned and aftermentioned aspects, wherein: The polyisocyanate is selected from one or more of toluene diisocyanate, 4,4'-diphenylmethane diisocyanate, 4,4'-dicyclohexylmethane diisocyanate, isophorone diisocyanate, hexamethylene diisocyanate, 1,4-cyclohexane diisocyanate, naphthalene diisocyanate and a modified substance, an isomer or a polymer thereof;

The polyether polyol has a number average molecular weight of 500-8000 and a functionality of 2-3, and the polyether polyol is selected from one or more of polytetrahydrofuran glycol and propylene oxide polyether polyol.

8. A process for preparing the multiphase particle according to any of aforementioned and aftermentioned aspects, characterized by comprising the steps of:
(1) reacting a polyisocyanate with a polyether polyol to form a polyurethane prepolymer to obtain an A-component;
(2) mixing a raw material including an aqueous silicate salt solution and a nano filler to obtain a B-component, mixing the B-component with the A-component, and curing the mixture to obtain a sheet-like elastic product;
(3) comminuting the sheet-like elastic product and sieving to obtain the multiphase particles.

9. The process for preparing the multiphase particle according to any of aforementioned and aftermentioned aspects, characterized in that:
In the step (1), the ratio of the mole number of the isocyanic acid group in the polyisocyanate to the mole number of the hydroxyl group in the polyether glycol is 1.1:1-2:1;
In the step (2), the conditions for mixing the A-component and the B-component comprise the stirring rate: 1500-2000 rpm, the mixing time: 15-90 s, and the mixing temperature: 50-70° C.

10. The process for preparing the multiphase particle according to any of aforementioned and aftermentioned aspects, characterized in that:
In the step (1), the ratio of the mole number of the isocyanic acid group in the polyisocyanate to the mole number of the hydroxyl group in the polyether glycol is 1.1:1-1.5:1, preferably 1.1:1-1.2:1.

Technical Effect

According to the present invention, at least one of the following technical effects can be achieved: (1) the multiphase particle provided by the invention can improve the well cementation effect when applied to well cementation, reduce the well cementation times in the service life cycle of an oil well, improve the economic value of an individual well and save the operation cost.

(2) The multiphase particle has high bulk intensity and good interface cementing power with the hardened cement.

(3) The multiphase particle has good compatibility with cement, can obviously reduce the elastic modulus of the hardened cement, and has obvious toughening effect.

(4) The multiphase particle according to the present invention can be added into cement or drilling mud in any proportion in a dry mixing way according to the requirements, the mixing and injection of the mud are not influenced, the original well cementation process is not changed, and the applicability is strong.

(5) According to a preferred embodiment of the multiphase particle of the present invention, the elastic modulus of the hardened cement can be reduced while maintaining the strength of the hardened cement hardly reduced (and in some cases even increasing the strength of the hardened cement).

DETAILED DESCRIPTION OF THE INVENTION

Reference will now be made in detail to the present embodiments of the present invention, but it should be understood that the scope of the invention is not limited by the embodiments, but is defined by the appended claims.

All publications, patent applications, patents, and other references mentioned in this specification are herein incorporated by reference in their entirety. Unless defined otherwise, all technical and scientific terms used herein have the same meaning as commonly understood by one of ordinary skill in the art to which this invention belongs. In case of conflict, the present specification, including definitions, will control.

When the specification derives a material, a substance, a process, a step, a device, an element and the like with the expression such as "known to those skilled in the art", "prior art", or the analogous term, it is intended that the subject matter so derived encompasses those having been conventionally used in the art at the time of filing this application, but also includes those which may not be so commonly used at the present time, but will become known in the art as being suitable for a similar purpose.

All percentages, parts, ratios, and the like referred to within this specification are by weight and pressures are gauge pressures unless explicitly indicated.

In the context of this specification, any two or more embodiments of the present invention may be combined in any combination, and the resulting technical solution is part of the original disclosure of this specification, and is within the scope of the present invention.

N the context of this specification, the term "substantially" means the allowance of a deviation within ±20%, within ±15%, within ±10%, within ±5% or within ±2%, which is acceptable to those skilled in the art or considered reasonable by those skilled in the art.

According to one embodiment of the present invention, a multi-phase particle is provided. The multiphase particle according to the present invention has a multiphase structure comprising a first phase and a second phase. Preferably the multiphase structure consists of the first phase and the second phase. Herein, the multiphase structure can be confirmed by the SEM photograph of the multiphase particle.

Without being bound by any theory, the inventors of the present invention believe that the first phase is mainly composed of an organic substance, and the second phase is mainly composed of an inorganic substance. This can be confirmed from the significantly different Si and C contents of the two phases in the EDS spectrum of the multiphase particles. For this reason, the multiphase particle is sometimes also referred to as an organic-inorganic composite particle.

In the context of the present specification, the measurement conditions of SEM photographs and EDS energy spectra include: field emission scanning electron microscope (Japanese JEOL, model JSM-7200F), 10.0 KV, magnification limit: 5000 times, testing the surface of a sample by using a self-contained energy spectrum scanner of an electron microscope and automatically calculating to generate and output the mass percent measurement result. The sample is thoroughly dried before measurement. Before measurement, a sample is spray-coated with a conducting layer in a vacuum coating instrument, then the sample is adhered to a sample station by using a conducting double-sided adhesive, and then the sample is sent into the electron microscope for measurement.

According to an embodiment of the present invention, the multiphase structure has at least in part a morphology (1). According to the morphology (1), the first phase is a continuous phase having, at least in part, a porous structure, and the second phase is a dispersed phase. Herein, the morphology (1) can be confirmed by the SEM photograph of the multiphase particle.

According to an embodiment of the present invention, in the morphology (1), at least one of the second phases has a substantially spherical shape (referred to as a spherical second phase). Preferably 50% or more, 60% or more, 80% or more, 90% or more of the total or substantially all of the second phases has a substantially spherical shape.

According to an embodiment of the present invention, in the morphology (1), at least one of the spherical second phases is located within pores of the porous structure of the first phase. Herein, as the pores, substantially circular pores can be particularly enumerated. Preferably 50% or more, 60% or more, 80% or more, 90% or more of the total or substantially all of the spherical second phases is located within pores. In general, the amount of the pores is larger than the amount of the spherical second phases, but is not particularly limited. Herein, a plurality of the pores may exist independently to each other, or a plurality of the pores may be overlapped to form a composite pore. In the context of this specification, both the composite pore and the single pore are sometimes simply referred to as pores without distinction.

Figure 1A:
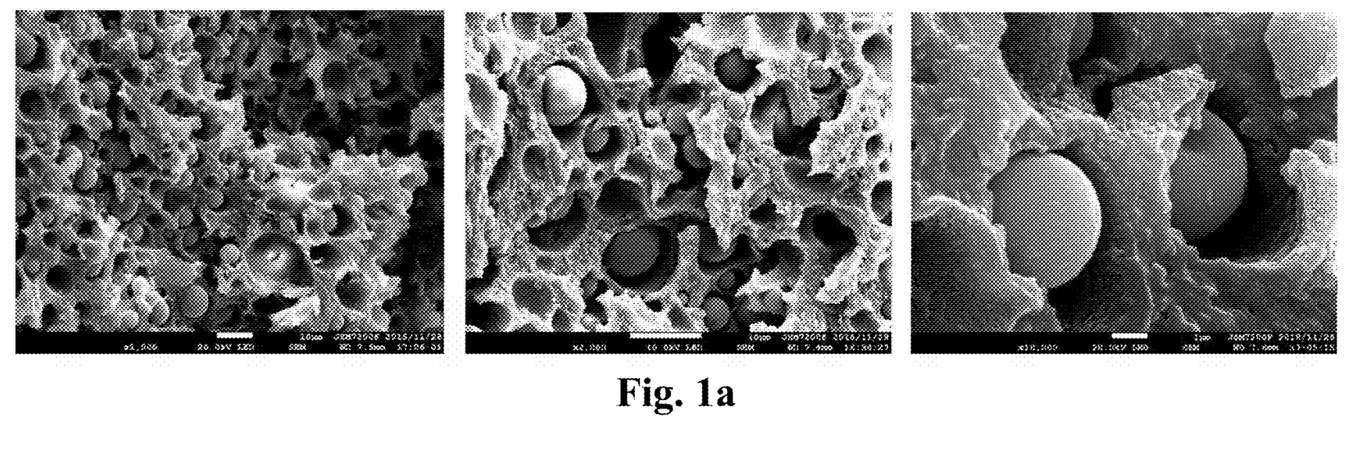
FIG. 1a is an SEM photograph (at different magnifications) of the multiphase particle of example 4.

For example, FIG. 1a is an SEM photograph (different magnifications) of the multiphase particle of Example 4. As shown in FIG. 1a, the first phase is a porous continuous phase, and the second phase is substantially spherical and is embedded in a part of pores of the first phase.

According to an embodiment of the present invention, the multiphase structure has at least in part a morphology (2). According to the morphology (2), the second phase is a continuous phase and the first phase is a dispersed phase. Herein, the morphology (2) can be confirmed by the SEM photograph of the multiphase particle.

According to an embodiment of the present invention, in the morphology (2), at least one of the first phases has a substantially columnar shape (referred to as a columnar first phase). Herein, as the columnar shape, for example, a cylinder shape and a prism shape can be enumerated. Preferably, 50% or more, 60% or more, 80% or more, 90% or more of the total or substantially all of the first phase has a substantially columnar shape.

According to an embodiment of the present invention, in the morphology (2), as the continuous phase, for example, a loose structure or an amorphous structure can be enumerated.

Figure 2A:
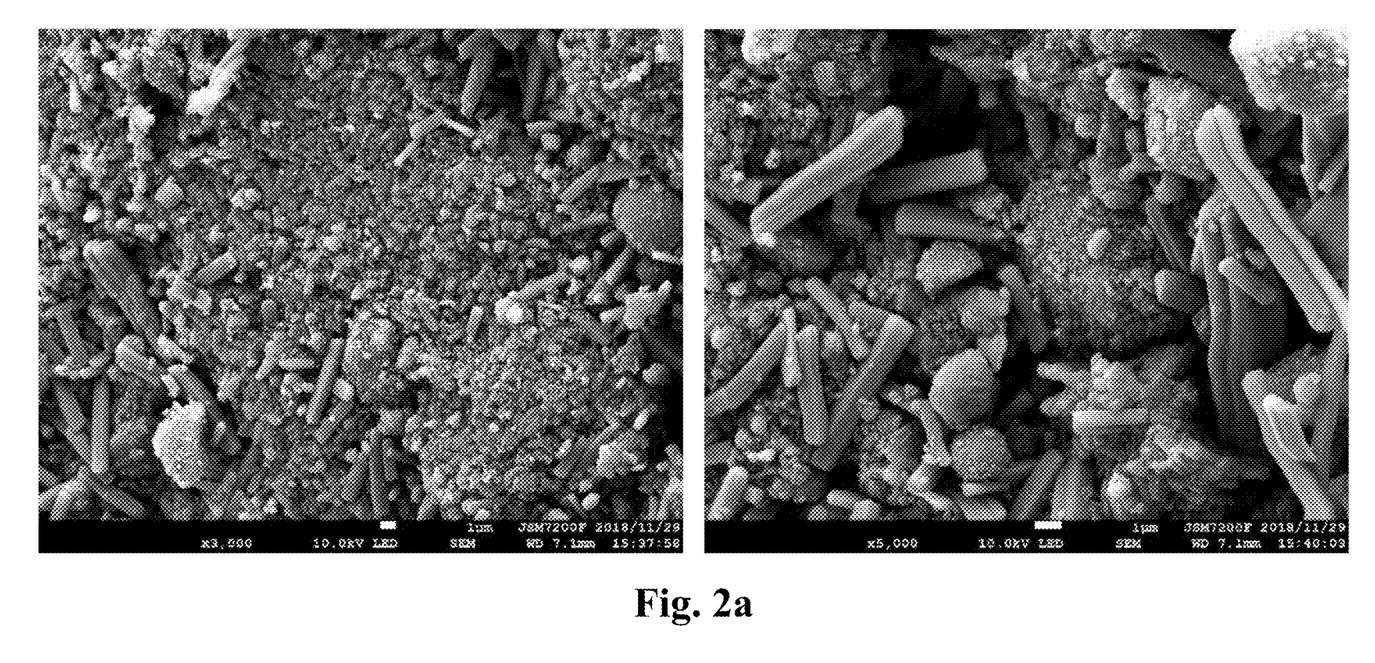
FIG. 2a is an SEM photograph (at different magnifications) of the multiphase particle of Example 5.

For example, FIG. 2a is an SEM photograph (different magnifications) of the multiphase particle of Example 5. As shown in FIG. 2a, the second phase is a continuous phase with a soil-like loose structure, and the first phase is present in a substantially prism shape.

According to an embodiment of the present invention, the multiphase structure has, at least in part, the morphology (3): a combination of the morphology (1) and the morphology (2). In other words, the morphology (3) is a mixed state of the morphology (1) and the morphology (2). Herein, the morphology (3) can be confirmed by the SEM photograph of the multiphase particle.

According to an embodiment of the present invention, the average particle size of the multiphase particle is at least 0.1 mm, at least 0.2 mm, at least 0.35 mm, at least 0.5 mm, at least 0.75 mm or at least 0.8 mm. In addition, the multiphase particle has an average particle size of at most 100 mm, at most 50 mm, at most 20 mm, at most 10 mm, at most 5 mm, at most 2 mm, at most 1.2 mm, or at most 1.0 mm. Herein, the average particle size is obtained by being sieved through a vibrating sieve (FRITSCH analysette3, Germany) using sieves of different pore sizes.

According to an embodiment of the present invention, in the multiphase particle, the Si element (as Si) content of the first phase is generally 1-8 wt %, preferably 1.5-5 wt %. Herein, the measurement conditions for the Si element content of the first phase include: the Si element content is measured by the EDS energy spectrum scanning method.

According to an embodiment of the present invention, in the multiphase particle, the Si element (as Si) content of the second phase is generally 15-25 wt %, preferably 18-21 wt %. Herein, the measurement conditions for the Si element content of the second phase include: the Si element content is measured by the EDS energy spectrum scanning method.

According to an embodiment of the present invention, in the multiphase particle, the ratio of the Si element content (in wt %) in the second phase to the Si element content (in wt %) in the first phase is 5-20, 8-12, or 9-11. Herein, the measurement conditions for the Si element content ratio include: the Si element content of the second phase and the Si element content of the first phase are measured by the EDS energy spectrum scanning method, and then the ratio is calculated out.

Figure 1B:
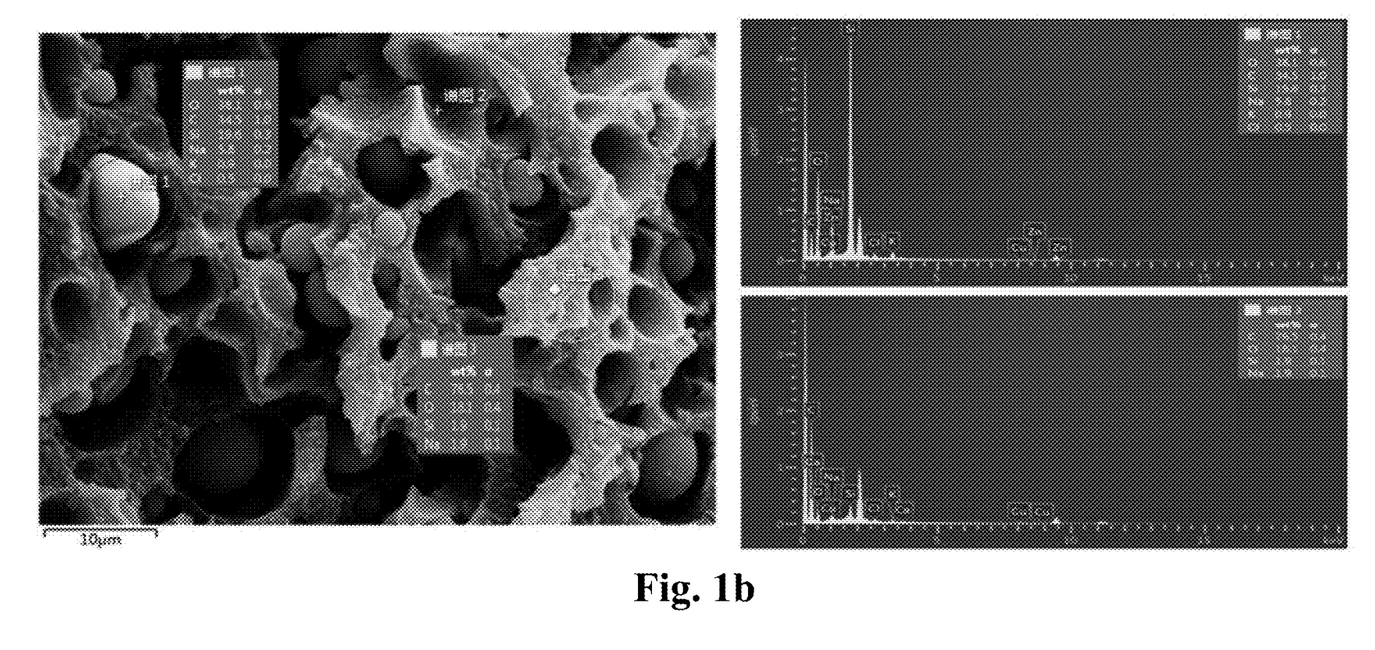
FIG. 1b is an EDS energy spectrum of the multiphase particle.
Figure 2B:
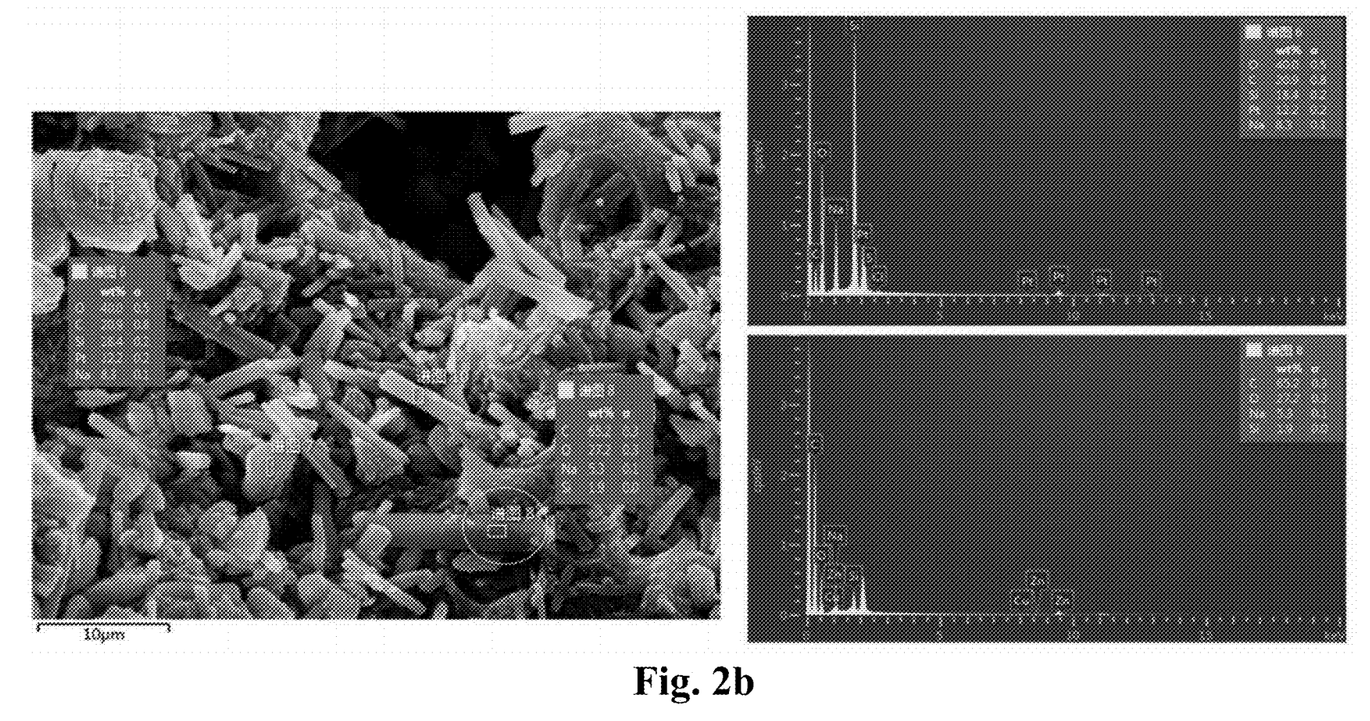
FIG. 2b is an EDS energy spectrum of the multiphase particle.

For example, FIG. 1b is an EDS energy spectrum of the multiphase particle of Example 4, and FIG. 2b is an EDS energy spectrum of the multiphase particle of Example 5, each showing the content (in wt %) of each constituent element of the first phase and the second phase, including the Si element content and the C element content, respectively.

Figure 3:
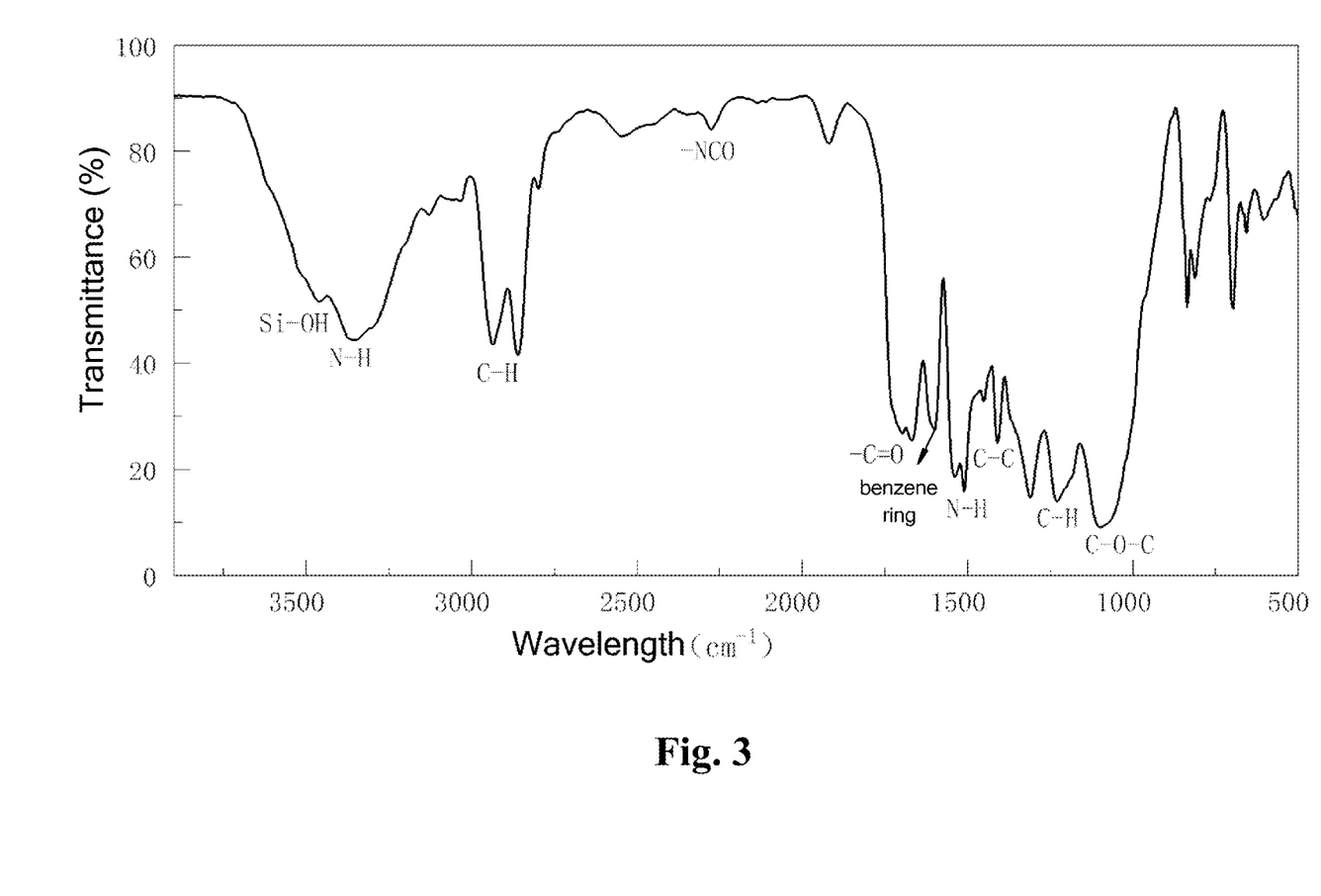
FIG. 3 is an infrared spectrum of the multiphase particle of Example 3.

According to an embodiment of the present invention, the multiphase particle has a surface Si—OH group. According to another embodiment of the present invention, the multiphase particle has a surface —NCO group. Alternatively, according to a preferred embodiment of the present invention, the multiphase particle has a surface Si—OH group and a surface —NCO group. Herein, these surface groups can be confirmed by the infrared analysis method. For example, FIG. 3 is an infrared spectrum of the multiphase particle of Example 3, clearly showing the presence of Si—OH and —NCO.

According to an embodiment of the present invention, the BET specific surface area of the multiphase particle is 1-200 $m^2/g$, 5-50 $m^2/g$ or 10-30 $m^2/g$. Herein, the measurement conditions for the specific surface area include: the specific surface area and pore size analyzer (Gold APP Instruments Corporation China, model V-Sorb 2800P), the measurement process for testing the specific surface area with the BET method (the nitrogen adsorption specific surface area test method): (1) weighing an empty sample tube m0; (2) adding a certain amount of the sample to the sample tube; (3) placing the sample tube in a degassing station, and degassing for 12 hours at 200° C.; (4) taking down the sample tube and weighing, m1; (5) placing the sample tube in a specific surface instrument and adding a liquid nitrogen, inputting m=m1-m0 on a computer, and starting the test.

According to an embodiment of the present invention, the water contact angle of the multiphase particle is 20-60°, 25-50°, 30-45° or 35-40°. Herein, the measurement conditions of the contact angle comprises: the contact angle surface property tester (Germany Dataphysics, model OCA50), using the liquid drop catching technique, adopting deionized water, using the contact angle tester to drop the liquid drop on the surface of the tested sample at room temperature 25° C., magnifying and observing the contact angle between the liquid drop and the tested sample.

According to an embodiment of the present invention, the pH value of the multiphase particle is 7-10, 7.5-9 or 8-9. Herein, the measurement conditions of the pH value comprise: 10 g of the sample is taken and immersed in 100 g of deionized water, the mixture is stirred for 24 hours, and then the pH of the supernatant is measured.

According to an embodiment of the present invention, the apparent density of the multiphase particle is 1.1-1.6 $g/cm^3$ or 1.2-1.3 $g/cm^3$. Herein, the measurement conditions for the apparent density include: the standard material block with the length, width and height of 2.54 cm is weighed, and then the apparent density is obtained by dividing the mass by the volume.

According to an embodiment of the present invention, in the multiphase particles, the diameter of the spherical second phase is 0.1-50 microns, preferably 0.2-25 microns, 0.5-20 microns, 1-10 microns or 2-8 microns. Herein, the diameter of the spherical second phase refers to the maximum size of the spherical second phase measured in the SEM photograph.

According to an embodiment of the present invention, in the multiphase particles, the orifice size of the pore is 0.05-100 microns, preferably 0.2-50 microns, 0.5-25 microns or 1-15 microns. Herein, the orifice refers to an opening of the pore to the outside. In addition, the term "orifice Size" refers to the maximum value of the distance between any two points on the orifice in the SEM photograph.

According to an embodiment of the present invention, in the multiphase particle, the length of the columnar first phase is 0.1-50 microns, preferably 0.2-20 microns, 0.5-10 microns or 1-5 microns. Herein, the length refers to the maximum size in the longitudinal direction in the SEM photograph.

According to an embodiment of the present invention, in the multiphase particles, the diameter of the columnar first phase is 0.1-10 microns, preferably 2-5 microns. Herein, the term "diameter" refers to the maximum dimension in a cross-section perpendicular to the longitudinal direction in the SEM photograph.

According to an embodiment of the present invention, the multiphase particle have a Si element (as Si) content of 0.5-5 wt %, preferably 1-3.5 wt %, based on 100 wt % of the total weight of the multiphase particle. Herein, the Si element content is measured by an elemental analysis method.

According to an embodiment of the present invention, in the multi-phase particle, the spherical second phase is located within the pores, for example in the embedded state as shown in FIG. 1a. Preferably, the ratio of the orifice size of the pores to the diameter of the spherical second phase is at least 1, greater than 1, 1.05, 1.1, 1.15 or 1.2, and at most 10, 5, 2 or 1.5.

According to an embodiment of the present invention, the multiphase particle comprises at least an organic substance and the silicon element in their constitution. Herein, as the silicon element, the silicon element present in an oxide form can be particularly enumerated, still especially a silicate salt and silica can be enumerated. As the organic substance, for example, an organic polymer, preferably a polyurethane can be enumerated, and an aromatic polyurethane can be particularly enumerated. For example, FIG. 3 is an infrared spectrum of the multiphase particle of Example 3, clearly showing the presence of Si—OH (corresponding to the silicon element) and the benzene ring (corresponding to the aromatic polyurethane).

According to an embodiment of the present invention, the multiphase particle optionally comprises an inorganic substance except for the silicon element in their constitution. Herein, as the inorganic substance, for example, a carbonate, a phosphate, a sulfate, an aluminate, a refractory oxide (except for silicon dioxide) and a hydroxide can be enumerated, and a carbonate and a hydroxide can be particularly enumerated.

According to an embodiment of the present invention, the compression strength of the multiphase particle is generally 25-60 MPa. The tensile strength of the multiphase particle is generally 12-18 MPa. The interface cementing power of the hardened cement of the multiphase particle is generally 1-3 MPa. Herein, the compression strength of the multiphase particle is measured according to GB/T 19139-2012 (Testing of well cements), the tensile strength is measured according to GB/T 1040-2006 (Plastics-Determination of tensile properties), and the interface cementing power of the hardened cement is measured according to GBT 16777-2008 (Test methods for building waterproofing coatings).

According to an embodiment of the present invention, the multiphase particle may be manufactured according to the following manufacturing process. According to the manufacturing process, at least a reaction step and a comminution step are included.

According to an embodiment of the present invention, in the reaction step, at least one polyfunctional organic monomer and at least one polyfunctional inorganic monomer exhibiting a chemical reaction activity to the polyfunctional organic monomer (abbreviated as the polyfunctional inorganic monomer) are reacted in presence of optionally at least one inorganic nanoparticle and optionally at least one polyfunctional reactive hydrogen organic compound in presence of a catalyst or in absence of a catalyst to obtain an organic-inorganic composite in a solid form. Preferably, the reaction occurs in absence of a catalyst.

According to an embodiment of the present invention, in the reaction step, as the polyfunctional organic monomer, for example, an organic compound having two or more isocyanate (—NCO) groups per molecule can be enumerated; a polyisocyanate, a polyurethane prepolymer and a polyurea prepolymer can be particularly enumerated, a $C_4^+$ aliphatic polyisocyanate, a $C_4^+$ cycloaliphatic polyisocyanate, an aromatic polyisocyanate, a polyurethane prepolymer derived from at least one of these polyisocyanates, and a polyurea prepolymer derived from at least one of these polyisocyanates can be particularly enumerated, an $C_4^+$ aliphatic diisocyanate, a $C_4^+$ cycloaliphatic diisocyanate, an aromatic diisocyanate, a polyurethane prepolymer derived from at least one of these diisocyanates, and a polyurea prepolymer derived from at least one of these diisocyanates can be particularly enumerated, toluene diisocyanate, 4,4'-diphenylmethane diisocyanate, 4,4'-dicyclohexylmethane diisocyanate, isophorone diisocyanate, hexamethylene diisocyanate, 1,4-cyclohexane diisocyanate, naphthalene diisocyanate, a polyurethane prepolymer derived from at least one of these diisocyanates, and a polyurea prepolymer derived from at least one of these diisocyanates can be particularly enumerated, 4,4'-diphenylmethane diisocyanate, a polyurethane prepolymer derived from the diisocyanate, and a polyurea prepolymer derived from the diisocyanate can be particularly enumerated, a polyurethane prepolymer derived from 4,4'-diphenylmethane diisocyanate can be particularly enumerated.

According to an embodiment of the present invention, in the reaction step, as the polyfunctional inorganic monomer, for example, an inorganic compound having 2 or more —OH groups per molecule and/or a precursor thereof can be enumerated, a silica sol, an alumina sol, a zirconium sol, a titanium sol, a silicate ester, an aqueous silicate ester solution, a silicate salt, an aqueous silicate salt solution, an aluminate salt, an aqueous aluminate salt solution, a titanate ester, an aqueous titanate ester solution, a zirconate ester, an aqueous zirconate ester solution and water can be particularly enumerated, a silica sol and an aqueous silicate salt solution still especially can be enumerated, and an aqueous silicate salt solution, for example, water glass still especially can be enumerated. The term solution as used herein includes a true solution and a colloidal solution without distinction.

According to an embodiment of the present invention, in the reaction step, as the inorganic nanoparticle, for example, a nanoparticle consisting essentially of an inorganic substance can be enumerated, for example, calcium carbonate nanoparticle, silica nanoparticle and hydrotalcite nanoparticle can be enumerated, calcium carbonate nanoparticle can be particularly enumerated, and heavy calcium carbonate nanoparticle still especially can be enumerated.

According to an embodiment of the present invention, in the reaction step, as the polyfunctional reactive hydrogen organic compound, for example, an organic compound containing two or more reactive hydrogen atoms per molecule can be enumerated, a polyamine, a polycarboxylic acid, a polyphenol, a polythiol and a polyol can be particularly enumerated, a polyether polyol and a polyester polyol can be particularly enumerated, and a polyether polyol can be particularly enumerated.

According to an embodiment of the present invention, in the reaction step, the number-average molecular weight of the polyether polyol is generally 500-8000, preferably 1000-6000. In addition, the hydroxy functionality of the polyether polyol is generally 2-3.

According to an embodiment of the present invention, in the reaction step, as the polyether polyol, for example, a polytetrahydrofuran diol and a polypropylene oxide polyol, preferably a polypropylene oxide polyol or a polypropylene oxide glycol can be enumerated. Herein, polypropylene oxide glycol 1000, polypropylene oxide glycol 2000, polypropylene oxide glycol 3000, polypropylene oxide glycol 5000 and polypropylene oxide glycol 6000 can be particularly enumerated.

According to an embodiment of the present invention, in the reaction step, as the catalyst, for example, a carboxylate salt, a metal alkyl compound, a quaternary ammonium salt and a tertiary amine can be enumerated, stannous octoate, potassium carboxylate and dibutyl tin dilaurate can be particularly enumerated.

According to an embodiment of the present invention, in the comminution step, the organic-inorganic composite material is comminuted to obtain the multiphase particle.

According to an embodiment of the present invention, in the comminution step, the average particle size of the multiphase particle is at least 0.1 mm, preferably at least 0.2 mm, at least 0.35 mm, at least 0.5 mm, at least 0.75 mm or at least 0.8 mm. In addition, the average particle size of the multiphase particle is at most 100 mm, preferably at most 50 mm, at most 20 mm, at most 10 mm, at most 5 mm, at most 2 mm, at most 1.2 mm or at most 1.0 mm. The sieving is carried out through a vibrating sieve (FRITSCH analysette3, Germany) using sieves of different pore sizes.

According to an embodiment of the present invention, in the manufacturing process, the ratio of the total weight of said at least one polyfunctional organic monomer and said optionally at least one polyfunctional reactive hydrogen organic compound (referred to as the organic component mass) to the total weight of said at least one polyfunctional inorganic monomer and said optionally at least one inorganic nanoparticle (referred to as the inorganic component mass) is 1:1-5:1, preferably 1.5:1-3.5:1.

According to an embodiment of the present invention, when the ratio of the organic component mass to the inorganic component mass is 1-10:99-90, the multiphase particle is generally present in a multiphase structure as shown in the morphology (1). Or alternatively, when the ratio of the organic component mass to the inorganic component mass is 20-60:80-40, the multiphase particle is generally present in a multiphase structure as shown in the morphology (2). Or alternatively, when the ratio of the organic component mass to the inorganic component mass is 10-20:90-80, the multiphase particle is generally present in a multiphase structure as shown in the morphology (3).

According to an embodiment of the present invention, in the manufacturing process, the weight ratio of said at least one polyfunctional inorganic monomer to said at least one inorganic nanoparticle is 100:90-100:30, 100:80-100:40, 100:75-100:45, or 100:65-100:55. Herein, as the polyfunctional inorganic monomer, various aqueous solutions or sols as described above can be particularly enumerated, an aqueous silicate salt solution or a silica sol can be particularly enumerated, and still especially water glass can be enumerated.

According to an embodiment of the present invention, in the manufacturing process, the ratio of the mole number of said at least one polyfunctional organic monomer (in terms of the functional group, particularly the isocyanate group) to the mole number of said at least one polyfunctional reactive hydrogen organic compound (in terms of the reactive hydrogen, especially in terms of the hydroxy) is 1.1:1-2:1, 1.1:1-1.5:1 or 1.1:1-1.2:1.

According to an embodiment of the present invention, in the manufacturing process, the solid content of various aqueous solutions or sols as described above is generally 20-70 wt %, 35-55 wt %, or 40-50 wt %. Herein, as the aqueous solution or the sol, an aqueous silicate salt solution or a silica sol can be particularly enumerated, still especially water glass can be enumerated.

According to an embodiment of the present invention, in the manufacturing process, the average particle size of said at least one inorganic nanoparticle is generally 150-500 nm, 200-350 nm or 270-300 nm. Herein, the average particle size is measured with a laser particle sizer (FRITSCH analysette22, Germany) in a dry powder measurement mode. The powder is added into a dry powder tank and automatically measured.

According to an embodiment of the present invention, in the manufacturing process, said polyurethane prepolymer is formed by the polyreaction of the aforementioned polyisocyanate and polyol in presence of a catalyst or in absence of a catalyst. Preferably, the polymerization occurs in absence of the catalyst. Herein as the polyisocyanate, toluene diisocyanate, 4,4'-diphenylmethane diisocyanate, 4,4'-dicyclohexylmethane diisocyanate, isophorone diisocyanate, hexamethylene diisocyanate, 1,4-cyclohexane diisocyanate and naphthalene diisocyanate can be particularly enumerated, and specifically 4,4'-diphenylmethane diisocyanate can be enumerated. As the polyol, a polyether polyol and a polyester polyol can be particularly enumerated, and especially a polyether polyol can be enumerated. Preferably, the polyether polyol has a number-average molecular weight of generally 500-8000, preferably 1000-6000, and a hydroxyl functionality of 2-3. As the polyether polyol, a polytetrahydrofuran diol and a polypropylene oxide polyol, preferably a polypropylene oxide polyol or a polypropylene oxide glycol can be particularly enumerated, still especially polypropylene oxide glycol 1000, polypropylene oxide glycol 2000, polypropylene oxide glycol 3000, polypropylene oxide glycol 5000 and polypropylene oxide glycol 6000 can be enumerated. As the catalyst, for example, a carboxylate salt, a metal alkyl compound, a quaternary ammonium salt and a tertiary amine can be enumerated, especially stannous octoate, potassium carboxylate and dibutyl tin dilaurate can be enumerated.

According to an embodiment of the present invention, in the manufacturing process, the NCO content of said polyurethane prepolymer is generally 1-7 wt %, 2-5 wt % or 3-4 wt %. Herein, the NCO content is calculated from the proportion of the excessive NCO content in the prepolymer.

According to an embodiment of the present invention, the manufacturing process comprises the steps of:
(1) reacting said at least one polyfunctional organic monomer and said at least one polyfunctional reactive hydrogen organic compound in a predetermined ratio in presence of said catalyst or in absence of said catalyst to obtain an A-component;
(2) mixing said at least one polyfunctional inorganic monomer and said at least one inorganic nanoparticle in a predetermined ratio to obtain a B-component;
(3) mixing and curing the B-component and the A-component; and
(4) comminuting and optionally sieving the solid obtained in step (3) to obtain the multiphase particle.

According to an embodiment of the present invention, in the step (1), the reaction is preferably carried out in absence of the catalyst.

According to an embodiment of the present invention, in the step (1), said at least one polyfunctional organic monomer (especially the polyisocyanate) and said at least one polyfunctional reactive hydrogen organic compound (especially the polyether polyol) may be carried out in the addition polymerization reaction manner conventionally known in the art, without particular limitation.

According to an embodiment of the present invention, in the step (1), the reaction temperature is generally 80-95° C. and the reaction time is generally 2-5 hours, and they are not particularly limited. Herein, stirring may also be used as required.

According to an embodiment of the present invention, in the step (1), as the obtained A-component, a polyurethane prepolymer can be particularly enumerated. Preferably, the NCO content of said polyurethane prepolymer is generally 1-7 wt %, 2-5 wt % or 3-4 wt %. Herein, the NCO content is calculated from the proportion of the excessive NCO content in the prepolymer.

According to an embodiment of the present invention, in the step (1), the ratio of the mole number of said at least one polyfunctional organic monomer (in terms of the functional group, particularly the isocyanate group) to the mole number of said at least one polyfunctional reactive hydrogen organic compound (in terms of the reactive hydrogen, especially in terms of the hydroxy) is 1.1:1-2:1, 1.1:1-1.5:1 or 1.1:1-1.2:1.

According to an embodiment of the present invention, in the step (2), the weight ratio of said at least one polyfunctional inorganic monomer to said at least one inorganic nanoparticle is 100:90-100:30, 100:80-100:40, 100:75-100:45 or 100:65-100:55.

According to an embodiment of the present invention, in the step (2), the mixing may be performed in a manner conventionally known in the art, and is not particularly limited. As the mixing temperature, for example, the room temperature can be enumerated, and as the mixing time, for example 2-3 hours can be enumerated.

According to an embodiment of the present invention, in the step (3), the mixing may be performed in a manner conventionally known in the art, and is not particularly limited. After mixing, a mixture to be cured is obtained.

According to an embodiment of the present invention, in the step (3), the mass ratio of the component A to the component B is generally 1:1-5:1, preferably 1.5:1-3.5:1.

According to an embodiment of the present invention, in the step (3), the mixing is performed under stirring. Herein, the stirring rate is generally 1500-2000 rpm, preferably 1600-1800 rpm.

According to an embodiment of the present invention, in the step (3), the mixing time is generally 15-90 s, preferably 20-40 s.

According to an embodiment of the present invention, in the step (3), the mixing temperature is generally 30-90° C., preferably 50-70° C.

According to an embodiment of the present invention, in the step (3), the curing may be performed in a manner conventionally known in the art, and is not particularly limited. Specifically, for example, the mixture to be cured may be poured into a mold and cured for 5-10 hours, thereby forming a sheet having a thickness of 1-1.2 mm.

According to an embodiment of the present invention, in the step (4), the comminution and the sieving may be performed in a manner conventionally known in the art, and are not particularly limited. Specifically, for example, the multiphase particle is obtained by comminuting the sheet obtained in the step (3) and sieving.

According to an embodiment of the present invention, in the step (4), the average particle size of the multiphase particle is at least 0.1 mm, preferably at least 0.2 mm, at least 0.35 mm, at least 0.5 mm, at least 0.75 mm or at least 0.8 mm. In addition, the average particle size of the multiphase particle is at most 100 mm, preferably at most 50 mm, at most 20 mm, at most 10 mm, at most 5 mm, at most 2 mm, at most 1.2 mm or at most 1.0 mm. Herein, the average particle size is obtained by being sieved through a vibrating sieve (FRITSCH analysette3, Germany) using sieves of different pore sizes.

According to an embodiment of the present invention, the present invention also relates to the use of the multiphase particle according to any of the preceding embodiments as a toughening agent, in particular the use as the toughening agent of the hardened cement.

According to an embodiment of the present invention, the present invention also relates to an inorganic cementitious composition. The inorganic cementitious composition at least contains an inorganic cementitious material and the multiphase particle according to any of the preceding embodiments. Preferably, the inorganic cementitious composition further contains water.

According to an embodiment of the present invention, in the inorganic cementitious composition, relative to 100 parts by weight of the inorganic cementitious material, the multiphase particle generally comprises 0.5-50 parts by weight, preferably 5-30 parts by weight, particularly 10-20 parts by weight.

According to an embodiment of the present invention, the present invention also relates to a manufacturing process for an inorganic cementitious composition. The manufacturing process at least comprises a step of mixing an inorganic cementitious material with the multiphase particle according to any of the preceding embodiments (abbreviated as the mixing step). According to the circumstances, water may also be added before, simultaneously with or after the mixing.

According to an embodiment of the present invention, in the mixing step, relative to 100 parts by weight of the inorganic cementitious material, the multiphase particle generally comprises 0.5-50 parts by weight, preferably 5-30 parts by weight, particularly 10-20 parts by weight.

According to an embodiment of the present invention, the present invention also relates to a process for toughening an inorganic cementitious material. The toughening process at least comprises a step of introducing the multiphase particle according to any of the preceding embodiments into the inorganic cementitious material (abbreviated as the introduction step).

According to an embodiment of the present invention, in the introduction step, relative to 100 parts by weight of the inorganic cementitious material, the multiphase particle generally comprises 0.5-50 parts by weight, preferably 5-30 parts by weight, particularly 10-20 parts by weight.

According to an embodiment of the present invention, as the aforementioned inorganic cementitious material, for example, a hydraulic inorganic cementitious material can be enumerated, cement can be particularly enumerated. In addition, various additives conventionally known in the art may also be added to the inorganic cementitious material as required, and are not particularly limited. As the additive, specifically for example, water, an aggregate, an inorganic filler (e.g., a pulverized fuel ash), an organic filler, a plasticizer, a colorant, a foaming agent, a leveling agent, a water reducing agent, a reinforcing agent, a water repellent agent, a binder, a rust inhibitor and the like can be enumerated. The amount of these auxiliaries may be any amount conventionally known in the art, and is not particularly limited.

EXAMPLES

The present invention will be described in further detail below by way of examples and comparative examples, but the present invention is not limited to the following examples.

Example 1

70 g of diphenylmethane diisocyanate (MDI) (MDI100, Yantai Wanhua Chemical Group) and 186.7 g of polypropylene oxide glycol (DL 1000, number average molecular weight=1000, functionality=2, BlueStar (Group) Shandong Dongda Chemical Co., Ltd) (100 Gppg1000) were mixed and reacted at 95° C. for 3 hours to obtain a polyurethane prepolymer formed with a polyisocyanate and a polyether polyol, (the molar ratio of the isocyanate to the polyether polyol=1.5:1). The polyurethane prepolymer had an NCO content of 3.05% and was used as the A-component. 100 g of an aqueous silicate salt solution (TLD-38, solid content=38%, Tonglida Sodium Silicate Co., Ltd, Zhang Jia Kou City) and 30 g of heavy calcium carbonate (280 nm, Sheng Lan Mineral Milling Plant, County Yi, Hebei) were mixed for 3 hours to obtain the B-component. 100 g of the A-component and 100 g of the B-component were mixed at a stirring rate of 1500 rpm and a mixing temperature of 60° C. for a mixing time of 30 s, and then the mixture was poured into a plate type mold and cured for 10 h to obtain a sheet with the thickness of 1 mm and 30 mm×30 mm. The sheet properties were as follows: the compression strength=30 MPa, the tensile strength=3.5 MPa, and the interface cementing power of the hardened cement=2.2 MPa. The sheet was comminuted to obtain a multiphase particle with the average particle size of 0.7-1.2 mm. The multiphase particle had the BET specific surface area of 8.8 $m^2/g$; the water contact angle of 42°; the pH value of 8.5; the apparent density of 1.45 $g/cm^3$; and the Si element (as Si) content of 3.3 wt %.

Example 2

100 g of diphenylmethane diisocyanate (MDI) (MDI100, Yantai Wanhua Chemical Group) and 200 g of polypropylene oxide glycol (DL 1000, number average molecular weight=1000, functionality=2, BlueStar (Group) Shandong Dongda Chemical Co., Ltd) (100 Gppg1000) were mixed and reacted at 95° C. for 3 hours to obtain a polyurethane prepolymer formed with a polyisocyanate and a polyether polyol, (the molar ratio of the isocyanate to the polyether polyol=2:1). The polyurethane prepolymer had an NCO content of 5.6% and was used as the A-component. 100 g of an aqueous silicate salt solution (TLD-38, solid content=38%, Tonglida Sodium Silicate Co., Ltd, Zhang Jia Kou City) and 50 g of heavy calcium carbonate (280 nm, Sheng Lan Mineral Milling Plant, County Yi, Hebei) were mixed for 3 hours to obtain the B-component. 100 g of the A-component and 80 g of the B-component were mixed at a stirring rate of 1500 rpm and a mixing temperature of 60° C. for a mixing time of 30 s, and then the mixture was poured into a plate type mold and cured for 10 h to obtain a sheet with the thickness of 1 mm and 30 mm×30 mm. The sheet properties were as follows: the compression strength=45 MPa, the tensile strength=6.5 MPa, and the interface cementing power of the hardened cement=2 MPa. The sheet was comminuted to obtain a multiphase particle with the average particle size of 0.7-1.2 mm. The multiphase particle had the BET specific surface area of 18 $m^2/g$; the water contact angle of 38.5°; the pH value of 8; the apparent density of 1.35 $g/cm^3$; and the Si element (as Si) content of 2.4 wt %.

Example 3

100 g of diphenylmethane diisocyanate (MDI) (MDI100, Yantai Wanhua Chemical Group) and 222.2 g of polypropylene oxide glycol (DL 1000, number average molecular weight=1000, functionality=2, BlueStar (Group) Shandong Dongda Chemical Co., Ltd) (100 Gppg1000) were mixed and reacted at 95° C. for 3 hours to obtain a polyurethane prepolymer formed with a polyisocyanate and a polyether polyol, (the molar ratio of the isocyanate to the polyether polyol=1.8:1). The polyurethane prepolymer had an NCO content of 4.64% and was used as the A-component. 100 g of an aqueous silicate salt solution (TLD-38, solid content=38%, Tonglida Sodium Silicate Co., Ltd, Zhang Jia Kou City) and 40 g of heavy calcium carbonate (280 nm, Sheng Lan Mineral Milling Plant, County Yi, Hebei) were mixed for 3 hours to obtain the B-component. 100 g of the A-component and 80 g of the B-component were mixed at a stirring rate of 2000 rpm and a mixing temperature of 65° C. for a mixing time of 35 s, and then the mixture was poured into a plate type mold and cured for 10 h to obtain a sheet with the thickness of 1 mm and 30 mm×30 mm. The sheet properties were as follows: the compression strength=55 MPa, the tensile strength=8 MPa, and the interface cementing power of the hardened cement=2.7 MPa. The sheet was comminuted to obtain a multiphase particle with the average particle size of 0.5-1.1 mm. The multiphase particle had the BET specific surface area of 8.8 $m^2/g$; the water contact angle of 37.5°; the pH value of 9; the apparent density of 1.35 $g/cm^3$; and the Si element (as Si) content of 2.6 wt %.

FIG. 3 was an infrared spectrum of the multiphase particle of Example 3, showing the presence of Si—OH (silicon hydroxy) at 3350 $cm^{-1}$, the presence of a benzene ring (corresponding to aromatic polyurethane) at 1450 $cm^{-1}$ and the presence of —NCO groups at 2265 $cm^{-1}$.

Example 4

100 g of diphenylmethane diisocyanate (MDI) (MDI100, Yantai Wanhua Chemical Group) and 222.2 g of polypropylene oxide glycol (DL 1000, number average molecular weight=1000, functionality=2, BlueStar (Group) Shandong Dongda Chemical Co., Ltd) (100 Gppg1000) were mixed and reacted at 95° C. for 3 hours to obtain a polyurethane prepolymer formed with a polyisocyanate and a polyether polyol, (the molar ratio of the isocyanate to the polyether polyol=1.8:1). The polyurethane prepolymer had an NCO content of 4.64% and was used as the A-component. 100 g of an aqueous silicate salt solution (TLD-38, solid content=38%, Tonglida Sodium Silicate Co., Ltd, Zhang Jia Kou City) and 35 g of heavy calcium carbonate (280 nm, Sheng Lan Mineral Milling Plant, County Yi, Hebei) were mixed for 3 hours to obtain the B-component. 100 g of the A-component and 100 g of the B-component were mixed at a stirring rate of 2000 rpm and a mixing temperature of 70° C. for a mixing time of 20 s, and then the mixture was poured into a plate type mold and cured for 10 h to obtain a sheet with the thickness of 1 mm and 30 mm×30 mm. The sheet properties were as follows: the compression strength=65 MPa, the tensile strength=3.5 MPa, and the interface cementing power of the hardened cement-4.5 MPa. The sheet was comminuted to obtain a multiphase particle with the average particle size of 0.6-1.1 mm. The multiphase particle had the BET specific surface area of 26 $m^2/g$; the water contact angle of 37.5°; the pH value of 9.5; the apparent density of 1.45 $g/cm^3$; and the Si element (as Si) content of 3.1 wt %.

FIG. 1a was an SEM photograph (different magnifications) of the multiphase particle of Example 4. As shown in FIG. 1a, the first phase was a porous continuous phase, and the second phase was substantially spherical. The orifice size of the pores in the first phase was 5-10 microns and the orifice size of the pores in the second phase was 2-8 microns. The second phase was embedded in the pores. FIG. 1b was an EDS energy spectrum of the multiphase particle of Example 4, showing the content (in wt %) of each constituent element of the first phase and the second phase, including the Si element content and the C element content. The first phase of the porous continuous phase had the Si element content of 1.9 wt % and the C element content of 76.5 wt %. The spherical second phase had the Si element content of 19.6 wt % and the C element content of 34.5 wt %. The ratio of the content (in wt %) of the Si element in the second phase to the content (in wt %) of the Si element in the first phase was 10.3.

Example 5

100 g of diphenylmethane diisocyanate (MDI) (MDI100, Yantai Wanhua Chemical Group) and 307.7 g of polypropylene oxide glycol (DL 1000, number average molecular weight=1000, functionality=2, BlueStar (Group) Shandong Dongda Chemical Co., Ltd) (100 Gppg1000) were mixed and reacted at 95° C. for 3 hours to obtain a polyurethane prepolymer formed with a polyisocyanate and a polyether polyol, (the molar ratio of the isocyanate to the polyether polyol=1.3:1). The polyurethane prepolymer had an NCO content of 1.9% and was used as the A-component. 100 g of an aqueous silicate salt solution (TLD-38, solid content=38%, Tonglida Sodium Silicate Co., Ltd, Zhang Jia Kou City) and 40 g of heavy calcium carbonate (280 nm, Sheng Lan Mineral Milling Plant, County Yi, Hebei) were mixed for 3 hours to obtain the B-component. 400 g of the A-component and 80 g of the B-component were mixed at a stirring rate of 2000 rpm and a mixing temperature of 60° C. for a mixing time of 35 s, and then the mixture was poured into a plate type mold and cured for 10 h to obtain a sheet with the thickness of 1 mm and 30 mm×30 mm. The sheet properties were as follows: the compression strength=55 MPa, the tensile strength=10 MPa, and the interface cementing power of the hardened cement-3.0 MPa. The sheet was comminuted to obtain a multiphase particle with the average particle size of 0.5-1.1 mm. The multiphase particle had the BET specific surface area of 28 $m^2/g$; the water contact angle of 40°; the pH value of 8; the apparent density of 1.25 g/cm³; and the Si element (as Si) content of 0.99 wt %.

FIG. 2a is an SEM photograph (different magnifications) of the multiphase particle of Example 5. As shown in FIG. 2a, the second phase was a continuous phase with a soil-like loose structure, and the first phase was present in a substantially prism shape. The prismatic first phase had a length of 4-8 microns and a diameter of 0.5-4 microns. FIG. 2b was an EDS energy spectrum of the multiphase particle of Example 5, showing the content (in wt %) of each constituent element of the first phase and the second phase, including the Si element content and the C element content. The second phase had a soil-like loose structure, and had the Si element content of 18.4 wt % and the C element content of 20.9 wt %. The first phase was present in a substantially prism shape and had the Si element content of 1.9 wt % and the C element content of 65.2%. The ratio of the content (in wt %) of the Si element in the second phase to the content (in wt %) of the Si element in the first phase was 9.7.

Example 6

100 g of diphenylmethane diisocyanate (MDI) (MDI100, Yantai Wanhua Chemical Group) and 266.7 g of polypropylene oxide glycol (DL 1000, number average molecular weight=1000, functionality=2, BlueStar (Group) Shandong Dongda Chemical Co., Ltd) (100 Gppg1000) were mixed and reacted at 95° C. for 3 hours to obtain a polyurethane prepolymer formed with a polyisocyanate and a polyether polyol, (the molar ratio of the isocyanate to the polyether polyol=1.5:1). The polyurethane prepolymer had an NCO content of 3.05% and was used as the A-component. 100 g of an aqueous silicate salt solution (TLD-38, solid content=38%, Tonglida Sodium Silicate Co., Ltd, Zhang Jia Kou City) and 55 g of heavy calcium carbonate (280 nm, Sheng Lan Mineral Milling Plant, County Yi, Hebei) were mixed for 3 hours to obtain the B-component. 280 g of the A-component and 80 g of the B-component were mixed at a stirring rate of 2000 rpm and a mixing temperature of 65° C. for a mixing time of 35 s, and then the mixture was poured into a plate type mold and cured for 10 h to obtain a sheet with the thickness of 1 mm and 30 mm×30 mm. The sheet properties were as follows: the compression strength-62 MPa, the tensile strength=12 MPa, and the interface cementing power of the hardened cement=2.5 MPa. The sheet was comminuted to obtain a multiphase particle with the average particle size of 0.5-1.1 mm. The multiphase particle had the BET specific surface area of 25 m²/g; the water contact angle of 36°; the pH value of 7.5; the apparent density of 1.2 g/cm³; and the Si element (as Si) content of 1.2 wt %.

A multiphase particle material was added into the cement to prepare the hardened cement, and the mechanical property of the hardened cement was measured. Among others, the curing condition of the hardened cement was 90° C. and 24 hours. The specific results were as follows:

Example 7

(1) 500 g of the oil well cement, 50 g of the multiphase particle material prepared in Example 4 and 242 g of deionized water were weighed out. (Water/cement ratio 0.44)

(2) The cement and the multiphase particle material were uniformly mixed to obtain a mixed powder; deionized water was added into a mixing container, a stirrer was rotated at a low speed (4000±200 revolutions per minute), the addition was completed within 15 seconds and the mixture was uniformly mixed to obtain a mixed powder, a cover of the stirrer was covered, the mixture was continuously stirred for 35 seconds at a high speed (12000±500 revolutions per minute) and uniformly stirred to obtain a cement slurry system with a density of 1.86 g/cm³.

(3) The above cement slurry was poured into curing blocks of 4 cm×4 cm×16 cm (used for measuring the flexural and elastic moduli) and 5.08 cm×5.08 cm×5.08 cm (used for measuring the compression strength), and cured in a water bath at 90° C. for 24 hours; and the cured cement was taken out to obtain a hardened cement block.

(4) The compression strength, the bending strength and the elastic modulus (the elastic modulus of the hardened cement under the stress of one third of the compression strength) of the hardened cement block were tested by using a German Toni compression and bending tester (specification model: ToniPRAXFmax. 300 KN) at the room temperature of 25° C. Testing results: the hardened cement block had a compression strength of 35.7 MPa, a bending strength of 7.5 MPa, and an elastic modulus of 7.5 GPa.

Example 8

500 g of the oil well cement, 50 g of the multiphase particle material prepared in Example 3 and 242 g of deionized water were weighed out. (Water/cement ratio 0.44)

The operation method according to (2) in Example 7 was repeated to produce a cement slurry having a density of 1.86 g/cm³. The operation method according to (3) in Example 7 was repeated to produce a hardened cement block. The test results of the operation method according to (4) in Example 7: the compression strength of the hardened cement block was 27.6 MPa, the bending strength was 7.2 MPa, and the elastic modulus was 7.1 GPa.

Example 9

500 g of the oil well cement, 50 g of the multiphase particle material prepared in Example 5 and 242 g of deionized water were weighed out. (Water/cement ratio 0.44)

The operation method according to (2) in Example 7 was repeated to produce a cement slurry having a density of 1.86 g/cm³. The operation method according to (3) in Example 7 was repeated to produce a hardened cement block. The test results of the operation method according to (4) in Example 7: the compression strength of the hardened cement block was 27.2 MPa, the bending strength was 6.0 MPa, and the elastic modulus was 6.7 GPa.

Example 10

500 g of the oil well cement, 50 g of the multiphase particle material prepared in Example 1 and 242 g of deionized water were weighed out. (Water/cement ratio 0.44)

The operation method according to (2) in Example 7 was repeated to produce a cement slurry having a density of 1.86 g/cm³. The operation method according to (3) in Example 7 was repeated to produce a hardened cement block. The test results of the operation method according to (4) in Example 7: the compression strength of the hardened cement block was 24.5 MPa, the bending strength was 6.1 MPa, and the elastic modulus was 6.9 GPa.

Example 11

500 g of the oil well cement, 25 g of the multiphase particle material prepared in Example 1 and 231 g of deionized water were weighed out. (Water/cement ratio 0.44)

The operation method according to (2) in Example 7 was repeated to produce a cement slurry having a density of 1.87 g/cm³. The operation method according to (3) in Example 7 was repeated to produce a hardened cement block. The test results of the operation method according to (4) in Example 7: the compression strength of the hardened cement block was 29.1 MPa, the bending strength was 7.0 MPa, and the elastic modulus was 7.7 GPa.

Comparative Example 12

Preparation of the Blank Cement Slurry (Net Slurry)

500 g of the oil well cement and 220 g of deionized water were weighed out. (Water/cement ratio 0.44)

The operation method according to (2) in Example 7 was repeated to produce a cement slurry having a density of 1.90 g/cm³. The operation method according to (3) in Example 7 was repeated to produce a hardened cement block. The test results of the operation method according to (4) in Example 7: the compression strength of the hardened cement block was 23.4 MPa, the bending strength was 6.2 MPa, and the elastic modulus was 8.7 GPa.

The results showed that the hardened cement with the addition of the multiphase particle materials of Examples 7-11 had a reduced elastic modulus and no strength reduction compared to the hardened cement from the net slurry of Comparative Example 12.

The invention claimed is:

1. A method for producing a multiphase particle, comprising:
    reacting at least one polyfunctional organic monomer and at least one polyfunctional inorganic monomer exhibiting a chemical reaction activity to the polyfunctional organic monomer in presence of at least one inorganic nanoparticle and at least one polyfunctional reactive hydrogen organic compound in presence of a catalyst or in absence of a catalyst, to obtain an organic-inorganic composite material in a solid form, and
    comminuting the organic-inorganic composite material to obtain the multiphase particle, wherein the average particle size of the multiphase particle is at least 0.1 mm and at most 100 mm,
    wherein the polyfunctional organic monomer is an organic compound having two or more isocyanate (—NCO) groups per molecule,
    wherein the polyfunctional inorganic monomer is an inorganic compound having 2 or more —OH groups per molecule and/or a precursor thereof, and
    wherein the polyfunctional reactive hydrogen organic compound is an organic compound containing two or more reactive hydrogen atoms per molecule.

2. The method according to claim 1, wherein the ratio of the total weight of said at least one polyfunctional organic monomer and said at least one polyfunctional reactive hydrogen organic compound to the total weight of said at least one polyfunctional inorganic monomer and said at least one inorganic nanoparticle is 1:1-5:1, and/or, the weight ratio of said at least one polyfunctional inorganic monomer to said at least one inorganic nanoparticle is 100:90-100:30, and/or, the ratio of the mole number of said at least one polyfunctional organic monomer (in terms of the functional group) to the mole number of said at least one polyfunctional reactive hydrogen organic compound (in terms of the reactive hydrogen) is 1.1:1-2:1.

3. The method according to claim 1, wherein the solid content of said aqueous solution or said sol is 20-70 wt %, and/or, the average particle size of said at least one inorganic nanoparticle is 150-500 nm.

4. The method according to claim 1, wherein said polyurethane prepolymer is formed by a polyreaction of said polyisocyanate and a polyol in presence of the catalyst or in absence of a catalyst, wherein a content of —NCO groups of said polyurethane prepolymer is 1-7 wt %,
    wherein the polyisocyanate is at least one selected from toluene diisocyanate, 4,4'-diphenylmethane diisocyanate, 4,4'-dicyclohexylmethane diisocyanate, isophorone diisocyanate, hexamethylene diisocyanate, 1,4-cyclohexane diisocyanate, and naphthalene diisocyanate,
    wherein the polyol is at least one selected from a polyether polyol and a polyester polyol, and
    wherein the catalyst is selected from a carboxylate salt, a metal alkyl compound, a quaternary ammonium salt, a tertiary amine stannous octoate, potassium carboxylate, and dibutyl tin dilaurate.

5. The method according to claim 1, wherein the reacting step comprises:
    reacting said at least one polyfunctional organic monomer and said at least one polyfunctional reactive hydrogen organic compound in a predetermined ratio in presence of said catalyst or in absence of said catalyst to obtain a polyurethane prepolymer having a NCO content of 1-7 wt %;
    mixing said at least one polyfunctional inorganic monomer and said at least one inorganic nanoparticle in a predetermined ratio to obtain a first mixture;
    mixing the polyurethane prepolymer with the first mixture to obtain a second mixture; and curing the second mixture to obtain a solid.

6. The method according to claim 5, wherein in the step (1), the ratio of the mole number of said at least one polyfunctional organic monomer (in terms of the functional group) to the mole number of said at least one polyfunctional reactive hydrogen organic compound (in terms of the reactive hydrogen) is 1.1:1-2:1, and/or, in the step (2), the weight ratio of said at least one polyfunctional inorganic monomer to said at least one inorganic nanoparticle is 100:90-100:30, and/or, in the step (3), the condition for mixing the component A and the component B is: the weight ratio of the component A to the component B is 1:1-5:1, the stirring speed: 1500-2000 rpm, mixing time: 15-90 s, and mixing temperature: 30-90° C.

7. The method according to claim 1, wherein:
    the polyfunctional organic monomer is at least one selected from a $C_4^+$ aliphatic polyisocyanate, a $C_4^+$ cycloaliphatic polyisocyanate, an aromatic polyisocyanate, a polyurethane prepolymer derived from at least one of these polyisocyanates, and a polyurea prepolymer derived from at least one of these polyisocyanates, and/or
    the polyfunctional inorganic monomer is at least one selected from a silica sol, an alumina sol, a zirconium sol, a titanium sol, a silicate ester, an aqueous silicate ester solution, a silicate salt, an aqueous silicate salt solution, an aluminate salt, an aqueous aluminate salt solution, a titanate ester, an aqueous titanate ester solution, a zirconate ester, an aqueous zirconate ester solution, and water, and/or the inorganic nanoparticle is at least one selected from calcium carbonate nanoparticle, silica nanoparticle and hydrotalcite nanoparticle, and/or the polyfunctional reactive hydrogen organic compound is at least one selected from a polyamine, a polycarboxylic acid, a polyphenol, a polythiol and a polyol, and/or the catalyst is at least one selected from a carboxylate salt, a metal alkyl compound, a quaternary ammonium salt, and a tertiary amine.

8. The method according to claim 1, wherein:

the polyfunctional organic monomer is at least one selected from toluene diisocyanate, 4,4'-diphenylmethane diisocyanate, 4,4'-dicyclohexylmethane diisocyanate, isophorone diisocyanate, hexamethylene diisocyanate, 1,4-cyclohexane diisocyanate, naphthalene diisocyanate, a polyurethane prepolymer derived from at least one of these diisocyanates, and a polyurea prepolymer derived from at least one of these diisocyanates, and/or the polyfunctional inorganic monomer is at least one selected from silica sol and an aqueous silicate salt solution.

* * * * *